United States Patent [19]

Sava et al.

[11] Patent Number: 5,311,774

[45] Date of Patent: May 17, 1994

[54] METHOD AND INSTALLATION FOR GENERATING A HIGH MASS FLOW OF UNPOLLUTED HIGH ENTHALPY AIR

[75] Inventors: Pierre Sava, Chatenay-Malabry; Alain Chevalier, Asnieres; Jean-Pierre Minard, Allois; Dominique Piton, Civray; Gérard Pradet, Le Subdray, all of France

[73] Assignee: Aerospatiale Societe Nationale Industrielle, Paris, France

[21] Appl. No.: 988,290

[22] Filed: Dec. 8, 1992

[30] Foreign Application Priority Data

Dec. 18, 1991 [FR] France .................. 91 15708

[51] Int. Cl.⁵ .............................................. G01M 9/00
[52] U.S. Cl. ..................................... 73/147; 280/737
[58] Field of Search ................. 73/147; 280/737, 741

[56] References Cited

U.S. PATENT DOCUMENTS

| | | | |
|---|---|---|---|
| 3,431,777 | 3/1969 | Norfleet | 73/147 |
| 3,505,867 | 4/1970 | Ortwerth et al. | 73/147 |
| 3,744,305 | 7/1973 | Sabol et al. | 73/147 |
| 3,807,755 | 3/1974 | Mason, Jr. | 73/147 |
| 3,983,749 | 10/1976 | Fletcher | 73/147 |
| 4,363,237 | 12/1982 | Creel, Jr. | 73/147 |
| 4,898,028 | 2/1990 | Brehm | 73/147 |

FOREIGN PATENT DOCUMENTS 2633677  1/1990  France .

OTHER PUBLICATIONS

ICIASF '89 Record, Sep., 1989, pp. 19–28.
Soviet Patents Abstracts, Mar. 7, 1990, week 9004.

Primary Examiner—Donald D. Woodiel
Attorney, Agent, or Firm—Remy J. VanOphem

[57] ABSTRACT

To generate an unpolluted high enthalpy air blast of several seconds duration a mass of feed air intended to constitute the high enthalpy air blast is preheated to a given temperature and stored at a given pressure in an elongate confinement tunnel with thermally insulative walls. A downstream orifice of the tunnel is kept closed and a blast of high-pressure air is applied to the upstream end of the mass of feed air to compress it quasi adiabatically to obtain a feed air temperature of at least 1,800K. The downstream orifice is opened and application of the high-pressure air blast is continued whereby the mass of feed air is expelled through the downstream orifice in the form of a feed blast, the temperature of which remains constant for several seconds.

29 Claims, 4 Drawing Sheets

METHOD AND INSTALLATION FOR GENERATING A HIGH MASS FLOW OF UNPOLLUTED HIGH ENTHALPY AIR

BACKGROUND OF THE INVENTION

1. Field of the Invention

The invention concerns a device and a method for generating during periods of at least several seconds a high mass flow of unpolluted high enthalpy air at a velocity of approximately Mach 6 (the expression "hypersonic flow" is often employed in relation to such velocities).

It is more particularly, although not exclusively, directed to generating a high mass flow of unpolluted air in a wide range of flight conditions over simulation periods sufficient for studies of the steady state operation of supersonic ram jets of the type usually referred to as "scramjets".

The invention is also applicable to studying the behavior of materials in hypersonic airflows, for example.

2. Description of the Prior Art

The use of a scramjet would appear to be the inevitable choice for the propulsion of hypersonic vehicles of the future, whether launch vehicles, missiles, aircraft, etc.

Testing scramjets on the ground entails simulating high Mach numbers and therefore generating high enthalpy airflows.

Existing scramjet test facilities in Europe are restricted to simulating Mach numbers below 6.5, i.e. to a temperature of around 1 800K. of the air to be injected into a motor under test. However, Mach 6.5 is at the very lowest end of the range of operation of scramjets which are designed to operate at velocities up to Mach 12 and above.

Attempts have been made to adapt existing test facilities to raise the aforementioned limit of Mach 6.5 but the results have been less than perfect (causing significant pollution of the air).

U.S. Pat. No. 3,744,305 teaches, for generating a flow of air at hypersonic velocities in the order of Mach 8 to Mach 10, pressurizing an enclosure with air at a pressure of 100 to 200 atmospheres and at a temperature of 5,500° R (3,060K) to 6,000° R (3,336K) and then injecting a gas adapted to react exothermically with the pressurized air so as to maintain the pressure and the temperature of the air as it escapes at high velocity from the enclosure. This chemical reaction is incompatible with obtaining unpolluted air.

The main difficulty is to raise the air to be fed to a motor under test to a high temperature without polluting it and while approximating as closely as possible actual flight conditions (in particular, over a duration of at least several seconds).

Conventional scramjet test facilities which heat the air by thermal exchange or by combustion in a burner combined with re-oxygenation cannot be used above Mach 6.5.

Accumulator and continuous type heaters are at the limits of existing technology; hydrogen burners, for example, supply a mixture of air and water vapor in which the quantity of water considerably disrupts combustion beyond Mach 6.5. with the result that combustion studies are not reliable.

The use of plasma torches may seem feasible but, apart from their high cost, they have the drawback of causing dissociation of the air molecules which disturbs the kinetics of the combustion chemistry.

As for so-called "shock tunnel" devices, they can generate high enthalpies for only a few milliseconds, totally insufficient for steady state combustion studies.

One example of a shock tunnel generating very short air blasts is described in U.S. Pat. No. 3,505,867.

Thus it has become clear that new propulsion unit test facilities must be developed if scramjets are to be developed further.

An object of the invention is to generate at moderate cost unpolluted airflows at high temperatures (at least 1,800K) for periods of several seconds to enable simulation of stable hypersonic combustion at Mach numbers of 6.5 and above, possibly as high as Mach 8 or above.

To this end the invention teaches that the air to be fed to the motor under test should be heated by compressing it.

Compressing a given quantity of air is known to increase its temperature.

If the compression is carried out under adiabatic conditions, that is to say without exchange of heat with the surrounding environment, and assuming that air is a perfect gas in the usual thermodynamics sense of the term, the laws of thermodynamics enable us to write:

$$\frac{T}{T_0} = \left(\frac{P}{P_0}\right)^{\frac{\gamma-1}{\gamma}}$$

in which:

To and Po are the temperature and pressure of the quantity of air in question before compression, T and P are the temperature and pressure of this quantity of air after compression, and $\gamma$ is the ratio (assumed constant) of the calorific capacities of this air at constant pressure and volume, respectively.

Taking $\gamma = 1.3$, the final temperature T obtained as a result of compression is therefore expressed as a function of the initial temperature To and the compression ratio (P/Po) by the equation:

$$T = T_0 \cdot \left(\frac{P}{P_0}\right)^{0.231}$$

This equation shows that if meaningful results are to be achieved a high compression ratio or a high initial temperature is required.

To compress the feed air the invention teaches the use, without the interposition of any screening means, of a high pressure air blast such as can be delivered by a conventional blow down type wind tunnel. The investment costs of the invention are reduced commensurately.

One example of a blow down type wind tunnel is described in French Patent No. 2,633,677 but is restricted to temperatures of 40° to 90°C. and to velocities of 200 to 300 m/s.

The performance that can be achieved by using an air blast to compress the feed air without the interposition of any screening means is improved if there is no (or little) mixing between the air blast and the feed air, i.e.

if the area of the interface between these masses of air is small. To this end, according to the invention the mass of feed air is elongate with a circular, polygonal or other cross section and the air blast is applied to one side of the mass of feed air while confining it laterally. To this end the mass of feed air is enclosed in a tube or tunnel with thermally insulative walls, that is to say a quasi adiabatic tube or tunnel.

For a given mass of feed air at given pressure and temperature the surface area of the interface and the degree of mixing between the air masses is inversely proportional to the length/cross section ratio of the mass of feed air (i.e. the tunnel).

However, thermal exchange between the feed air and the confining tunnel containing it is directly proportional to this ratio so that the more elongate the shape the more marked the departure from adiabatic compression.

A compromise is therefore required in respect of the length/cross section ratio of the mass of feed air in order to minimize the mixing of the air masses (and therefore the area of the interface with the air blast) and thermal exchanges (the area of the interface with the confinement tunnel).

The thermal losses are reduced if the time of thermal exchange at the boundaries of the feed air is short (and therefore compression is fast and the flow rate of the air blast is high) and also if the feed air is used quickly after it is compressed.

The compressed and therefore heated feed air is itself provided in the form of a blast of mass flow rate $d_r$ and of duration $t_r$ so that its total mass is given by the equation:

$$M_r = d_r \cdot t_r$$

The volume required to store this mass of feed air at pressure Po and temperature To is deduced using the laws of thermodynamics for perfect gases:

$$V = r \cdot (To/Po) \cdot M_r$$

in which:
r is a constant characteristic of the gas, expressed in energy per degree and per unit mabs (the value of this constant is approximately 287 J/K/kg for air).

This equation shows that the storage volume in the tunnel is inversely proportional to the storage pressure Po, which mitigates against a high compression ratio since the maximum pressure that can be obtained after compression is limited by the maximum pressure of the compression air blast.

SUMMARY OF THE INVENTION

The present invention is a method of generating an unpolluted high enthalpy air blast of several seconds duration in which a mass of feed air intended to constitute the high enthalpy air blast is preheated to a given temperature and stored at a given pressure in an elongate confinement tunnel with thermally insulative walls. A downstream orifice of the tunnel is kept closed and a blast of high-pressure air is applied to the upstream end of the mass of feed air to compress it quasi adiabatically to obtain a feed air temperature of at least 1,800K, and the downstream orifice is opened and application of the high-pressure air blast is continued whereby the mass to feed air is expelled through the downstream orifice in the form of a feed blast, the temperature of which remains constant for several seconds.

According to preferred and in at least some cases combinable features of the invention the mass of feed air is preheated to a temperature of at least 500K.

The mass of feed air is preheated to approximately 1,250K.

The mass of feed air is heated by passing it through a static preheater.

The mass of feed air is compressed by a compression ratio of at least 5.

The high-pressure air blast is preheated to at least approximately the same temperature as the mass of feed air.

The mass of feed air and the high-pressure air blast are preheated by passing them through a heater-integrated into the tunnel, wherein the mass of feed air is at least 5 kg.

The interior of the elongate tunnel has a length to mean width ratio between 20 and 150, and preferably the ratio is between 25 and 30.

The present invention is also an installation for generating an unpolluted high enthalpy air blast embodying a blow down type wind tunnel adapted to inject a blast of air under pressure into a pressurized air circulation line; an elongate adiabatic confinement tunnel having an inlet connected to the pressurized air circulation line and an outlet orifice provided with a temporary closure device and adapted to contain a mass of feed air; means for heating the mass of feed air to a given temperature; and a control system adapted to trigger the arrival of a blast of air from the blow down type wind tunnel on the mass of feed air so as to compress it and heat it and then to open the outlet orifice of the tunnel at the temporary closure device.

According to preferred and in at least some cases combinable features of the invention the heating means are connected between the pressurized air circulation line and the inlet of the adiabatic confinement tunnel.

The heating means and the adiabatic confinement tunnel are parts of a common tunnel, which has an outer shell lined with an insulative layer in the form of a cylindrical jacket closed by ends respectively incorporating an inlet orifice and the outlet orifice. The insulative layer is separated from the flow of air by protective screens and heating elements are provided for preheating the protective screens and pressure balancing passages are formed in the thickness of the insulative layer.

The heating means are fixed array of tubes parallel to the axis of the common tunnels, wherein the tubes of the array are open at their ends.

The heating means are connected to a preheater system, which includes a compressed air supply connected to the preheater system by a line passing through a burner.

The preheater system has an electrical power supply unit connected electrically to the array of tubes to generate heat therein by the Joule effect. The temporary closure device is composed of two calibrated rupture disks, an upstream rupture disk of which is calibrated to a pressure lower than the pressure obtained at the end of compression and a downstream rupture disk of which is calibrated to a pressure higher than the pressure at the end of compression. The downstream disk is provided with a destruction unit and the volume between the disks communicates with a compressed air feed line adapted to balance the pressure on either side of the upstream disk.

The compressed air feed line communicates with the inlet of the common tunnel and the destruction unit is of the pyrotechnic type.

The interior of the adiabatic confinement tunnel has a ratio of its length to its mean width between 20 and 150, and preferably the ratio is between 25 and 30.

Objects, features and advantages of the invention will emerge from the following description given by way of non-limiting example with reference to the accompanying diagrammatic drawings.

DETAILED DESCRIPTION OF THE PREFERRED EMBODIMENT

Figure 1:
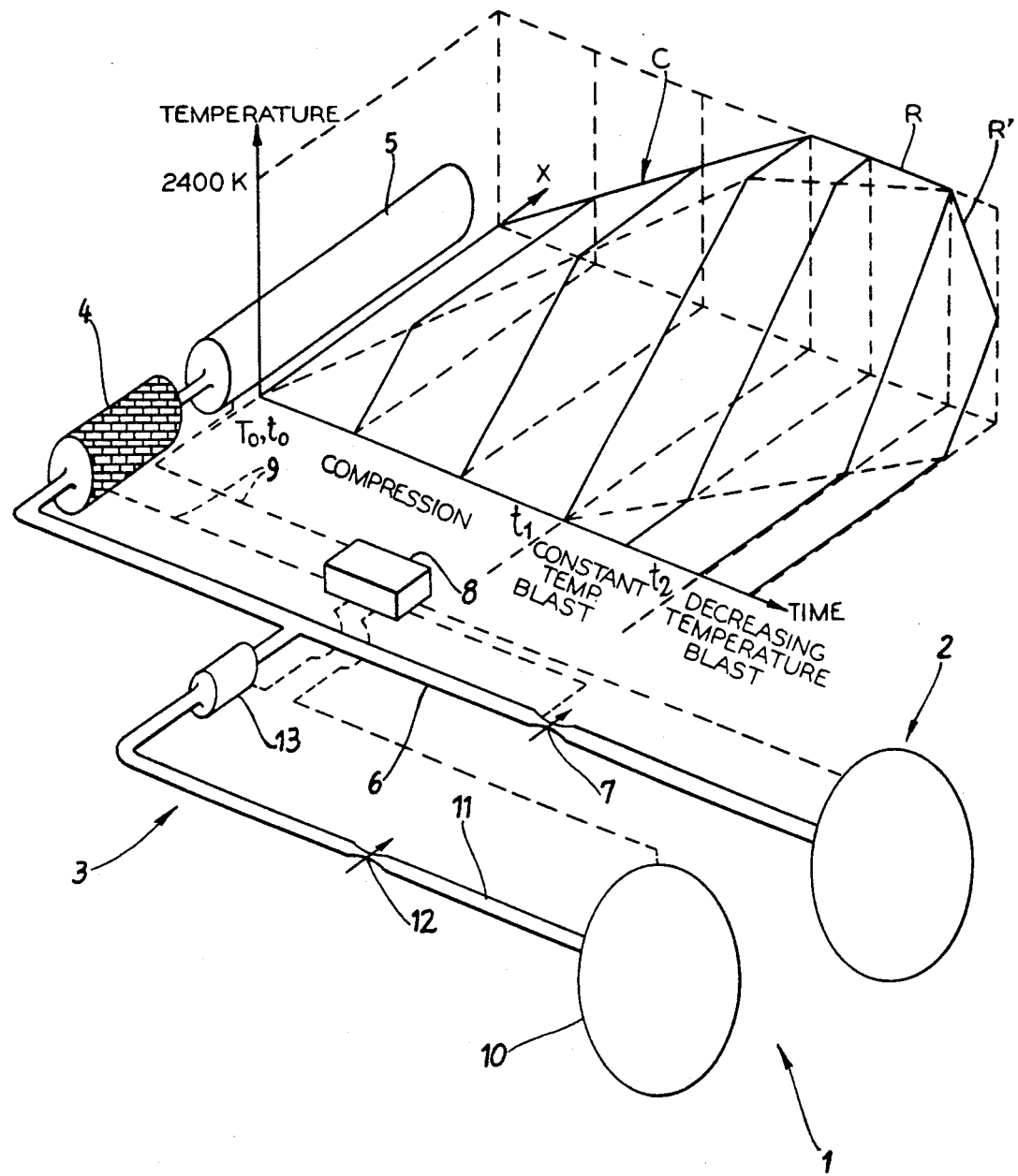
FIG. 1 is a diagrammatic perspective view of an airflow generator installation in accordance with the invention including a tunnel and incorporates a three-dimensional graph showing for each point inside the tunnel along the X axis the local temperature T of the air as a function of time t.

FIG. 1 shows in diagram form an installation 1 adapted to generate an unpolluted airflow at a velocity of at least Mach 6.5

The installation 1 embodies a blow down type wind tunnel 2, a preheater system 3, a heater tunnel 4, a confinement tunnel 5 which in this example is separate from the heater tunnel 4, an airflow line 6 joining the blow down type wind tunnel 2 to the heater tunnel incorporating a regulator valve 7 and to which the preheater system 3 is connected, and a control system 8 with control lines 9.

The blow down type wind tunnel 2 is of any appropriate known type. In practice it is usually a storage tank of air at a high pressure (250 bars, for example) often including a plurality of cylinders joined in parallel which are emptied simultaneously to inject a blast of air into the airflow line 6. The flowrate of this air blast is adjusted by means of the regulator valve 7.

The preheater system 3 is also of a kind known in itself and includes a storage tank 10 of air under pressure (at a pressure of 60 bars, for example) adapted when it is opened to deliver the air into a line 11 incorporating a regulator valve 12 passing through a heater unit 13, in this instance a hydrogen burner, and terminating at the airflow line 6 on the downstream side of the regulator valve 7.

Figure 2:
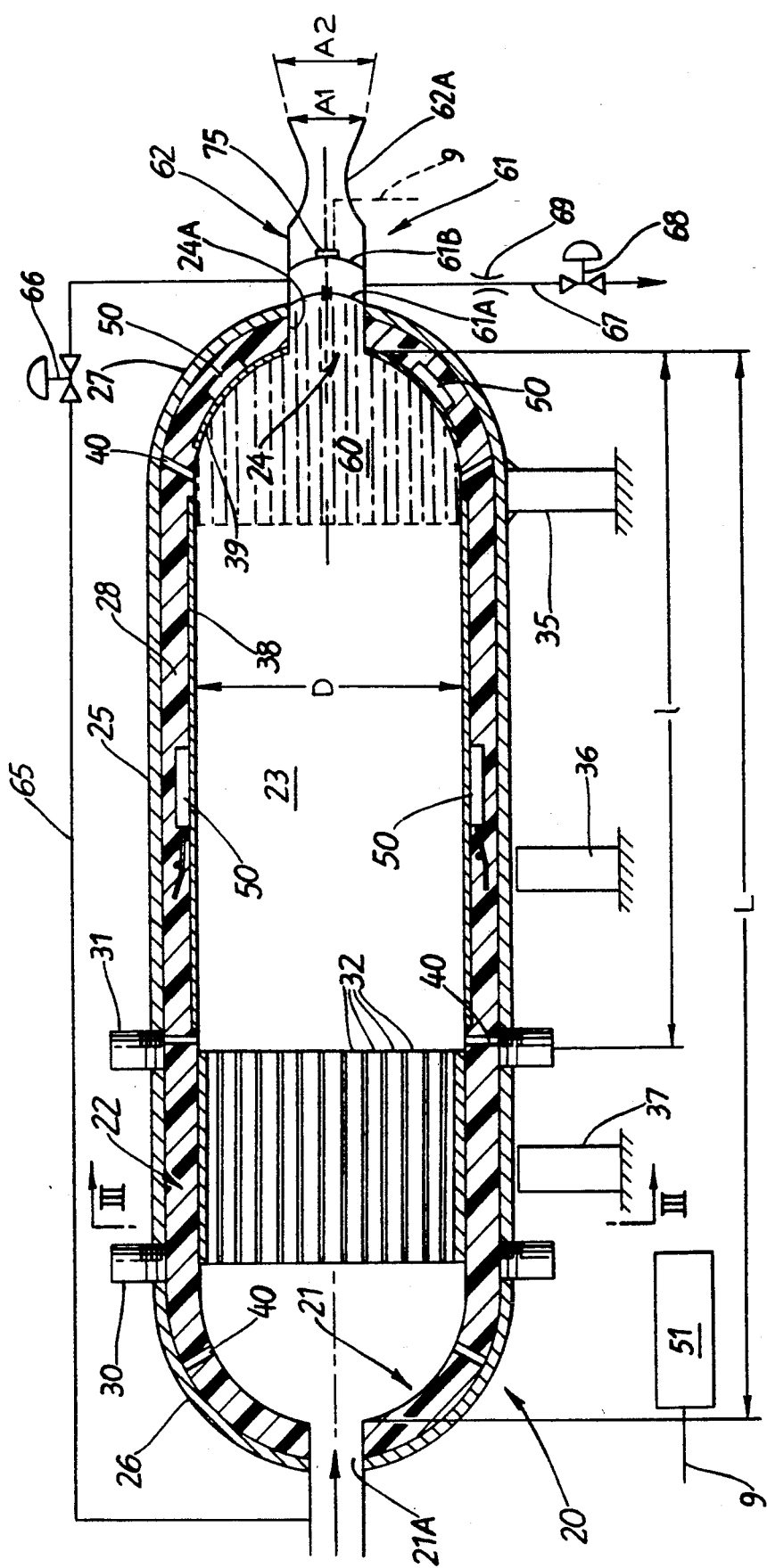
FIG. 2 is a diagrammatic view of the tunnel from FIG. 1 in cross section.

FIG. 2 shows the heater tunnel 4 and the confinement tunnel 5 in more detail. In this example these tunnels are parts of a single tunnel 20.

The tunnel 20 is in the form of a long tube having an inlet section 21 with an inlet orifice 21A, an exchanger section 22 constituting the heater tunnel 4 of FIG. 1, an adiabatic confinement section 23 constituting the tunnel 5 of FIG. 1 and an outlet section 24 with an outlet orifice 24A.

The tunnel 20 has an outer shell 25 in the form of a cylindrical steel boilerplate jacket with hemispherical ends 26 and 27 which are parts of the inlet section 21 and outlet section 24, respectively. The shell is lined with an insulative layer 28 intended to minimize heat exchange between the interior of the tunnel and its outer shell and to render the tunnel 20 adiabatic.

Hoops 30 and 31 with a nominal working pressure of 100 bars are provided on respective sides of the exchanger section 22. They can be demounted to fit the insulative layer 28 and the heat exchanger elements of the exchanger section 22.

Access to the interior of the adiabatic tunnel 20 after the hoops are mounted is available either through the inlet orifice 21A or through the outlet orifice 24A.

The shell assembly rests on masonry cradles. A cradle 35 at the downstream end constitutes a fixed point support whereas the shell can expand freely relative to the other cradles, two of which, 36 and 37, are shown.

Various orifices (not shown) are provided in the shell in addition to the inlet and outlet orifices 21A and 24A for various lines connecting measurement sensors to the exterior, pressure balancing circuits and other ancillaries; some of these items are described in more detail later.

The insulative layer 28 fixed to the inside of the shell 25 provides thermal protection for the shell by maintaining its inside surface at a temperature below a low threshold value which is 100° C. in this example.

The inner surface of the insulative layer 28 is protected mechanically by refractory steel plates 38 and 39 designed to prevent entrainment of insulation particles by the air blast.

The insulative layer is in practice formed by adhesively bonding a plurality of members to the shell 25 with expansion joints (not shown) between them to enable unrestricted relative movement in response to temperature changes to prevent excessive mechanical stresses. In this example the insulative layer is of a ceramic type refractory material.

Air passages 40 are formed in the thickness of the insulative layer to balance the pressure between its inside and outside surfaces.

The inlet section 21 and the inlet orifice 21A serve to collect the air of a compression blast and to distribute it across all of the inside cross section of the tunnel. The orifice 21A is connected to the high-pressure airflow line 6.

The function of the exchanger section 22 is to transfer to the air of a compression blast calories stored during the preheating phase.

The exchanger section 22 is a metal mass through which the compression blast is caused to flow.

Figure 3:
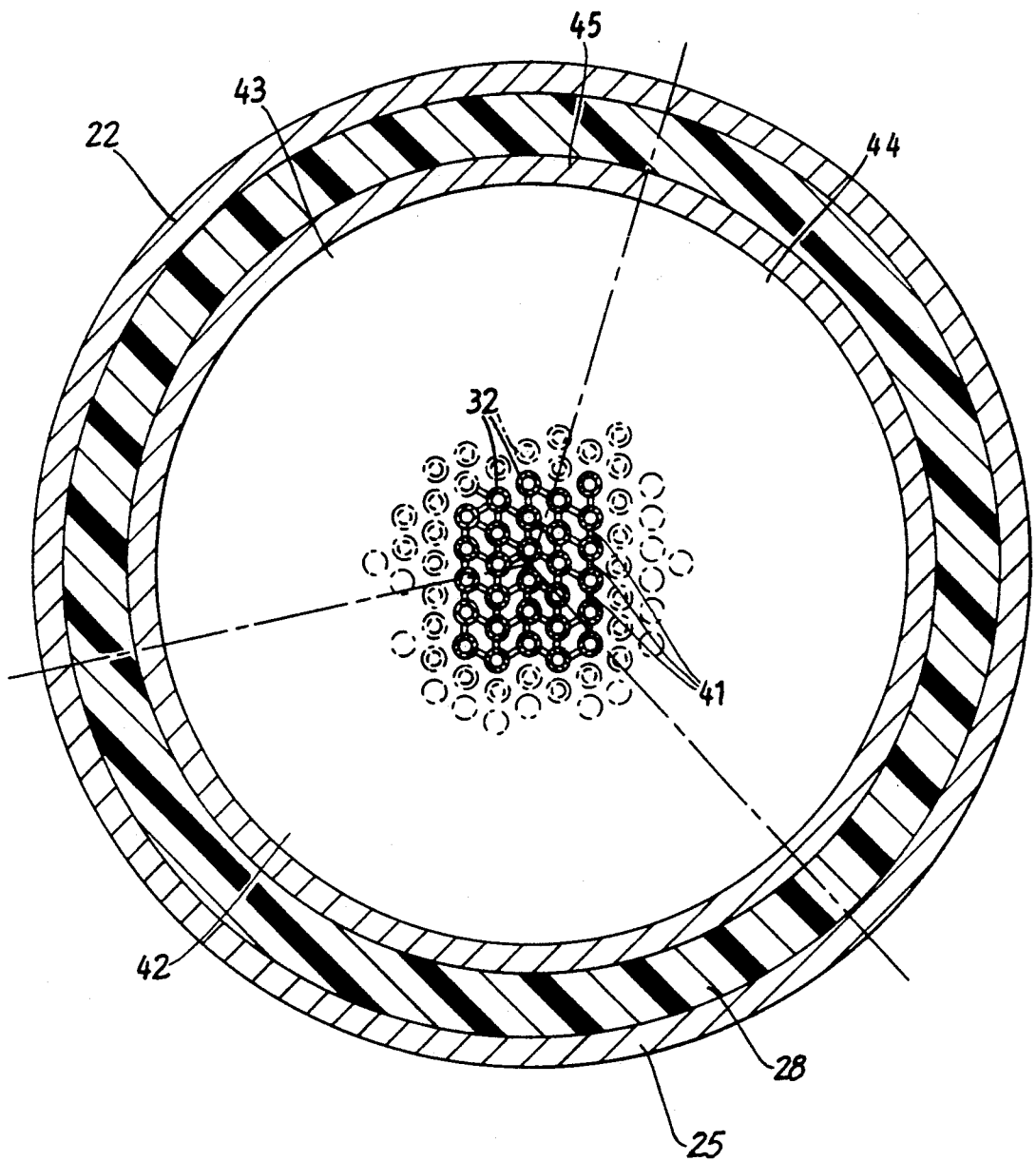
FIG. 3 is a view of the exchanger section of the tunnel from FIG. 2 in transverse cross section on the line III—III in FIG. 2.

As can be seen in more detail in FIG. 3, the annular mass of heat exchanger elements is a plurality of refractory steel tubes 32 (only some of which are shown) disposed in rows in a quincunx arrangement and open in the axial direction at their upstream and downstream ends.

Heat is exchanged between the air blast and the inside and outside surfaces of the tubes. Insulative chocks 41 are placed between the rows of tubes to space them apart and to retain them in the axial direction during an air blast.

In this example the tubes are disposed in three identical sets 42, 43 and 44. All the tubes are contained within a metal structure 45 which holds them in position within the exchanger section 22 inside the insulative layer.

These tubes may be heated to the required temperature of approximately 1,250K (around 1,000° C.), for example, by circulation of air from the preheater system 3.

As an alternative, the tubes 32 which are in this example divided into three identical sets may be heated electrically by passing electric current through them. They then act as elements. The preheater system 3 is then not required and the orifice 21A may be closed by any appropriate known means during the preheating phase.

Because the tubes are divided into three groups a three-phase 660 V electrical power supply is used: the tubes are connected in series within each group, the groups being connected in parallel to each phase. The electric current is fed in via a cold area in the inlet section 21 of the tunnel by means of sealed passages in the shell 25.

Heating the tubes to the nominal temperature requires some five to six hours.

In the downstream part of the tunnel, after the exchanger tubes 32, heating elements 50 are advantageously mounted in the insulative wall 28 to heat the protective plates 38 and 39.

The rise in temperature is controlled by varying the supply voltage and monitored by temperature sensors (not shown) on the tubes 32.

The electrical power supply installation 51 (see FIG. 2) is in practice disposed in the immediate vicinity of the tunnel 20.

As a further alternative, the tubes may be heated by closed circuit circulation of hot air generated by electrical heating. In this case valves (not shown) isolate the closed heater circuit during pressurization of the feed air.

The adiabatic confinement section 23 is the part of the tunnel 20 on the downstream side of the exchanger 22, on the downstream side of which is obtained, after high-speed compression, a blast of feed air at very high temperature in the form of an adiabatic plug 60 shown diagrammatically in FIG. 2.

The function of the outlet section 24 is to capture the air of the adiabatic plug 60 in order to channel and direct it through the orifice 24A to a feed pipe of the motor under test at the required Mach number. This orifice incorporates a fast opener device 61 and is connected to a convergent-divergent nozzle 62 with a throat 62A appropriate to the required Mach number and in practice manufactured from carbon impregnated carbon fiber.

The fast opener device 61 embodies two precut rupture disks 61A and 61B disposed in series in the pipe at the orifice 24A.

The first (upstream) disk 61A is rated to have a moderate bursting pressure and thermally insulates the second (downstream) disk 61B (which is rated to have a bursting pressure close or equal to the shell design pressure) from the interior of the tunnel.

A branch line 65 runs from the area in which the high-pressure airflow line 6 joins the inlet orifice 21A. It enables the volume between the disks 61A and 61B to be filled so as to balance the pressure across the upstream side (first) disk 61A as much as possible. The branch line 65 is provided with a valve 66 and is extended beyond the volume between the disks by a line 67 fitted with a valve 68 and a flowrate regulator 69.

A leakage flow calibrated by the regulator 69 enables evacuation of heated air due to the increase in pressure whereby the downstream disk 61B may be kept at a low temperature in the order of 20° to 50° C.

A pyrotechnic charge 75 is placed on the downstream disk 61B so that it can be burst at the correct time when the feed air adiabatic plug 60 is formed. The emptying of the volume between the disks then bursts the upstream disk 61A which causes the air of the adiabatic plug 60 to flow into, the nozzle or test pipe 62 in the form of an air blast.

One installation as described above is designed to feed a scramjet chamber with an inlet cross section A1 of 0.035 $m^2$ with a 30 kg/s blast of feed air at 2,400K for five seconds using the AEROSPATIALE blow down type wind tunnel at SUBDRAY near Bourges.

Satisfactory operation is achieved using the following parameters, given the performance capability of this blow down type wind tunnel, the estimated thermal losses and the technology chosen for the heater:

| | |
|---|---|
| Temperature of air filling tunnel (heated by heater) | To = 1,250 K. |
| Tunnel filing pressure | Po = 4.11 bars |
| Maximum outlet pressure after compression | Pr = 80 bars |
| Outlet temperature | Tr = 2,400 K. |
| Internal volume of adiabatic confinement section (after heater) | V = 131 $m^3$ |
| Inside diameter | D = 1.8 m |
| Tunnel length | l = 51.5 m |
| Length/diameter ratio | l/D = 28.6 |
| Mass of air to be heated in heater (approx) | 2,500 kg |
| Tunnel compression feed flowrate | 300 kg/s |
| Time for pressure to increase from 4.11 to 80 bars | 6.1 s |
| Outside diameter of tunnel jacket | 2.5 m |
| Length of Jacket | L = 67.5 m |
| Length of tubes | 10 m |
| Internal volume of jacket | 171 $m^3$ |
| Jacket design pressure | 85 bars |
| Jacket design temperature | 100° C. |
| Downstream disk 61B calibration pressure | 85 bars |
| Upstream disk 61A calibration presssure | 40 bars |

The standard CODAP design code for the design of pressure vessels was used for the jacket.

The air blast is generated as follows:
1. The tunnel 20 is initially filled with air at atmospheric pressure and temperature.
2. The exchanger section, the screens or plates 38 and 39 and the air in the adiabatic confinement section are heated electrically to a nominal temperature of 1,250K.
3. Air from the blow down type wind tunnel is injected into the tunnel through the exchanger section to sweep out the original air until homogeneous pressure Po and temperature To are obtained in the tunnel. Because the exchanger section is static, the air is heated without being polluted.
4. At time $T_0$ a high flowrate air blast increases the pressure in the tunnel and compresses the air from phase 3 from pressure/temperature Po/To to pressure/temperature Pr/Tr. The trend of the temperature of the air at the downstream end of the tunnel is shown by the thick line curve C in the three-dimensional graph in FIG. 1. This temperature increases throughout this compression phase.
5. The pyrotechnic charge 75 is fired at time $t_1$ to burst the disks 61B and then 61A virtually simultaneously, following which the air of the adiabatic plug 60 (see FIG. 2) is ejected in the form of an air blast R at constant temperature. The duration of this feed air blast is proportional to the mass of air stored in phase 3 and inversely proportional to the blast flowrate.

6. The feed air blast ends at time $t_2$, when all of the mass of air stored in phase 3 is used up: there is then obtained a blast R' at decreasing temperature which can be used with benefit to study the behavior of the scramjet under transient conditions.

It will be understood that in an intermediate part of the tunnel between the heater section and the outlet orifice there is initially (from time $t_0$) a temperature rise which is inversely proportional to the distance of the area from the outlet orifice followed by a steady temperature period followed by a temperature drop.

The admission of the high-pressure blast of phase 4 via the heater 4 has the advantage of procuring continuous variation of temperature along the tunnel which limits the thermal effects of mixing of gases in the tunnel and provides the blast R'.

As an alternative, the compression air may be injected "cold", that is to say without any preheating.

All of phases 1 through 6 may be achieved with a single blast or with a plurality of shorter blasts staggered in time. A single blast has the advantage of minimizing thermal losses.

Simulation by a 30 kg/s blast at 2,400K lasting 5 s represents a dynamic pressure $P_{dyn}$ of around 1.1 bars with a Mach number of 7.6, that is a chamber inlet cross section A1 of 0.035 m² and a chamber outlet cross section A2 of 0.105 m² (these cross sections are shown in FIG. 2).

The installation described above can produce longer blasts if the nozzle cross section and therefore the outlet flowrate are reduced. This makes it possible to cover, in addition to the specific flight conditions (Pr, Tr or Mach number and altitude) on which the ratings are based, a wide range of forced flow flight conditions by using lower temperatures or flowrates for the feed blast by modifying the values of Po and To before compression. In this way this installation can be used for studies in the range of velocities from Mach 6 through Mach 8.

The reasoning on which the ratings are based is as follows: the caliber (cross section) of the scramjet and a given set of flight conditions (Mach number and altitude) are used to deduce the pressure, temperature and mass flowrate of the blast to be generated; the tunnel dimensions can be chosen by choosing the maximum permissible pressure, the maximum heating temperature and the duration of the blast.

The dimension and performance data for the tunnel and its blow down type wind tunnel is then used to define a wide range of simulation points characterized by the simulation pressure $P_{i2}$, the simulation temperature $T_{i2}$ and the blast duration.

Figure 4:
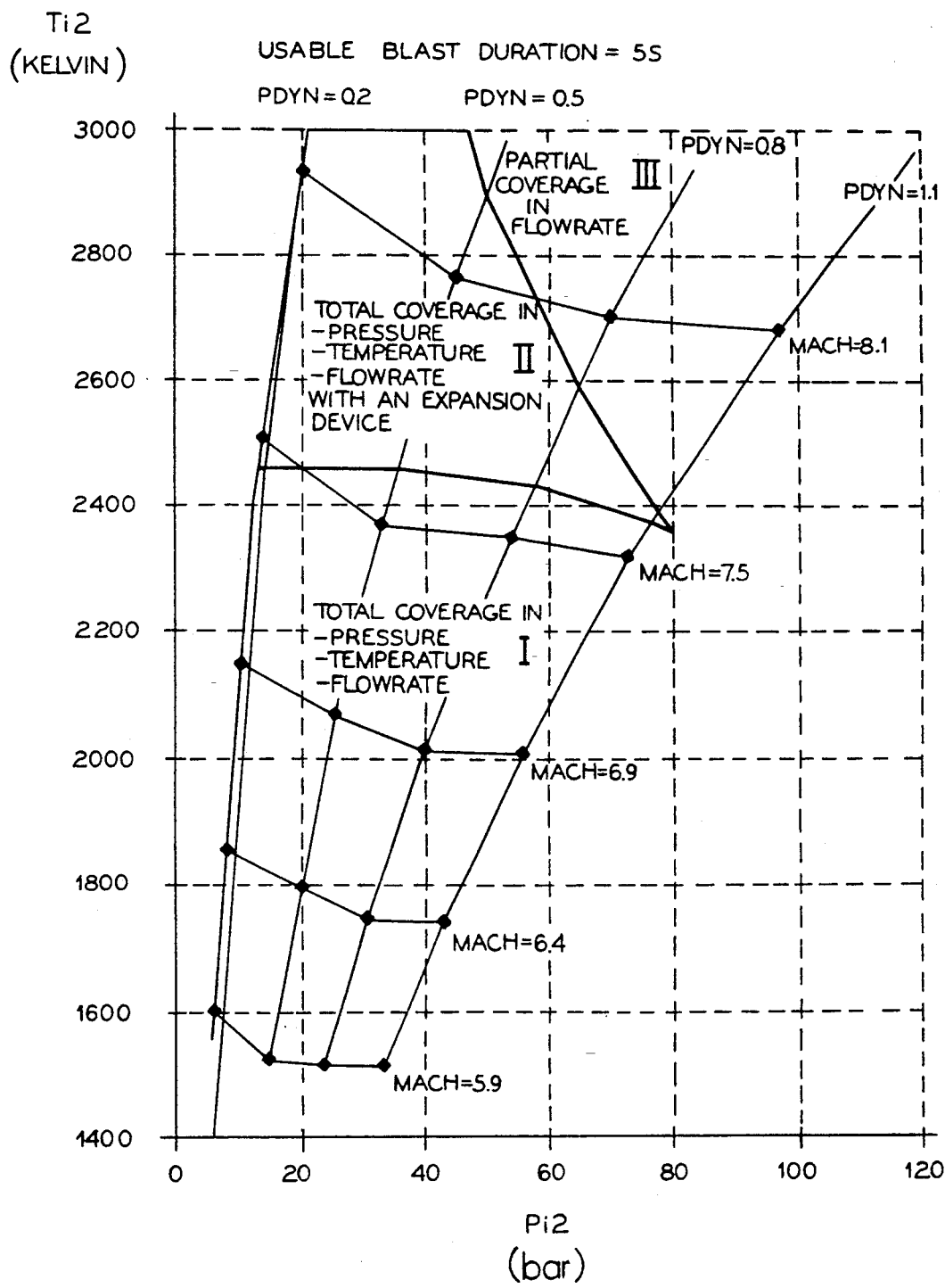
FIG. 4 is a temperature/pressure graph showing flight conditions that can be simulated by a given installation for a blast duration of 5 s.

FIG. 4 shows the coverage of the SUBDRAY adiabatic tunnel (see above) determined for a feed blast duration of five seconds. The total coverage in pressure, temperature and flowrate is limited to an envelope I by limiting the pressure $P_{i2}$ to below 80 bars and by limiting the temperature at the maximum target flowrate (for the envisaged blast duration).

It is possible (envelope II) to exceed the temperature of 2,400K for simulation at low dynamic pressures (whence a low value of $P_{i2}$ and a low flowrate); it is then possible to feed the tunnel at a pressure above $P_{i2}$ and to increase further the heating by compression, a head loss (expansion) device being then disposed between the tunnel and the scramjet. If reducing the duration of the feed blast or the caliber of the scramjet (i.e. the flowrate) is acceptable it is possible to increase the coverage further towards high values $T_{i2}$ and $P_{i2}$ (envelope III).

This figure also shows various curves for constant Mach number and constant dynamic pressure, respectively.

The following table shows the maximum Mach number that can be simulated for various dynamic pressures $P_{dyn}$:

| | Max Mach No. Max Mach No. simulatable for $t_{blast} = 5$ s | | |
| --- | --- | --- | --- |
| $P_{dyn}$ | without expansion device | with expansion device | with part coverage in flowrate |
| 0.2 | 7.45 | >8.5 | — |
| 0.5 | 7.61 | 8.3 | — |
| 0.8 | 7.64 | 7.9 | 8.34 |
| 1.1 | 7.59 | 7.6 | 7.66 |

For temperatures above 3,000K dissociation phenomena become significant and the designs employed cannot produce a realistic Mach number.

The generation of high speed hot airflows may be of use in testing and choosing materials for hypersonic vehicles.

A nozzle fitted with an expansion box at the outlet of the tunnel can provide flow at a static pressure and a temperature typical of flight conditions.

To conclude, it appears that the adiabatic tunnel concept enables unpolluted air feed to scramjets over a wide range of flight conditions and with simulation periods sufficient for studying the operation of such motors.

It is feasible to use this facility to study materials in hypersonic airflows.

From the above description, it will be apparent to one skilled in the art how to implement the control system 8 and the control lines 9.

It goes without saying that the foregoing description has been given by way of non-limiting example only and that numerous variants may be put forward by one skilled in the art without departing from the scope of the invention.

We claim:

1. A method for generating an unpolluted high enthalpy air blast of several seconds duration, said method comprising the steps of:
    heating a mass of feed air to a temperature;
    storing said mass of feed air at a pressure in an elongate confinement tunnel having thermally insulative walls and a closed downstream orifice;
    introducing a blast of high-pressure air to an upstream end of said mass of feed air so as to compress said mass of feed air quasi adiabatically to obtain a feed air temperature of at least about 1,800K; and
    opening said downstream orifice while continuously introducing said high-pressure air blast such that said mass of feed air is expelled through said downstream orifice in the form of a feed blast having a temperature which remains substantially constant for several seconds.

2. A method according to claim 1 wherein said heating step includes heating said mass of feed air to a temperature of at least about 500K.

3. A method according to claim 2 wherein said heating step includes heating said mass of feed air to approximately 1,250K.

4. A method according to claim 1 wherein said heating step includes passing said mass of feed air through a static preheater.

5. A method according to claim 1 wherein said introducing step includes compressing said mass of feed air by a compression ratio of at least about 5.

6. A method according to claim 1 further comprising the step of preheating said high-pressure air blast to at least approximately said temperature of said mass of feed air.

7. A method according to claim 1 further comprising the step of preheating said mass of feed air and said high-pressure air blast with a heater integrally formed within said elongate confinement tunnel.

8. A method according to claim 1 wherein said heating step includes providing at least about 5 kg of said mass of feed air.

9. A method according to claim 1 wherein said storing step includes storing said mass of feed air within said elongate confinement tunnel which has a length to width ratio of between about 20 and about 150.

10. A method according to claim 9 wherein said storing step includes limiting said length to mean width ratio between about 25 and about 30.

11. An installation for generating an unpolluted high enthalpy air blast, said installation comprising:
    means for generating a blast of air under pressure;
    elongate adiabatic confinement means having an inlet in fluidic communication with said generating means, an outlet orifice, and a temporary closure device at said outlet orifice for containing a mass of feed air;
    means in thermal communication with said mass of feed air for heating said mass of feed air to a predetermined temperature; and
    a control system for initiating flow of said blast of air from said generating means on said mass of feed air so as to compress and heat said mass of feed air and open said outlet orifice at said temporary closure device.

12. An installation according to claim 11 wherein said heating means are connected between said generating means and said inlet of said elongate adiabatic confinement means.

13. An installation according to claim 12 wherein said heating means and said elongate adiabatic confinement means are members of a common tunnel.

14. An installation according to claim 13 wherein said common tunnel comprises an outer shell, an insulative layer lining said outer shell, an inlet orifice disposed at one end of said common tunnel, and said outlet orifice disposed at an opposite end of said common tunnel.

15. An installation according to claim 14 wherein said common tunnel further comprises means provided on said insulative layer for substantially isolating said insulative layer from said blast of air.

16. An installation according to claim 15 further comprising heating elements in thermal communication with said isolating means for preheating said isolating means.

17. An installation according to claim 14 further comprising pressure balancing passages formed through said insulative layer.

18. An installation according to claim 13 wherein said heating means comprise a fixed array of tubes oriented substantially parallel to a longitudinal axis of said common tunnel.

19. An installation according to claim 18 wherein each of said fixed array of tubes is open at oppositely disposed ends.

20. An installation according to claim 18 further comprising a preheater system connected to said heating means.

21. An installation according to claim 20 wherein said preheater system comprises a compressed air supply, passage means interconnecting said compressed air supply and said heating means, and means associated with said passage means for heating air flowing through said passage means.

22. An installation according to claim 20 wherein said preheater system comprises an electrical power supply unit connected electrically to said fixed array of tubes so as to generate heat therein by the Joule effect.

23. An installation according to claim 13 wherein said temporary closure device comprises an upstream rupture disk which is calibrated to rupture at a first pressure, a downstream rupture disk which is calibrated to rupture at a pressure higher than said first pressure, means provided at said outlet orifice for rupturing said downstream rupture disk, and means in fluidic communication with a volume defined between said upstream and downstream rupture disks for balancing a pressure on an upstream and downstream side of said upstream rupture disk.

24. An installation according to claim 23 wherein said fluidic communications means communicates with said inlet of said common tunnel.

25. An installation according to claim 23 wherein said rupture means is a pyrotechnic device.

26. An installation according to claim 11 wherein said elongate adiabatic confinement means has a ratio of length to mean width of between about 20 and about 150.

27. An installation according to claim 26 wherein said ratio is between about 25 and about 30.

28. A method for generating an unpolluted high enthalpy air blast of several seconds duration, said method comprising the steps of:
    storing a mass of feed air at a pressure in an elongate confinement tunnel, said elongate confinement tunnel having a length to mean width ratio of between about 20 and about 150, insulative walls, and a closed downstream orifice;
    heating said mass of feed air to a temperature of at least about 500K;
    preheating a mass of high-pressure air to a temperature of at least about said temperature of said mass of feed air;
    introducing said mass of high-pressure air to an upstream end of said mass of feed air so as to quasi adiabatically compress said mass of feed air to obtain a feed air temperature of at least about 1,800K; and
    opening said downstream orifice while continuously introducing said high-pressure air blast such that said mass of feed air is expelled through said downstream orifice in the form of a feed blast having a temperature which remains substantially constant for several seconds.

29. An installation for generating an unpolluted high enthalpy air blast of several seconds duration, said installation comprising:
    a blow down type wind tunnel for generating a blast of air under pressure;
    an air circulation line in fluidic communication with said blow down type wind tunnel for receiving said blast of air;

an elongate confinement tunnel having an inlet in fluidic communication with said air circulation line, an outlet orifice, and a temporary closure device disposed at said outlet orifice for retaining a mass of feed air within said elongate confinement tunnel, said elongate confinement tunnel having a length to mean width ratio of between about 20 and about 150;

means disposed within said elongate confinement tunnel for heating said mass of feed air to a temperature of at least about 500K;

means in thermal communication with said blast of air for preheating said blast of air to a temperature of at least about said temperature of said mass of feed air; and a control system for initiating flow of said blast of air from said blow down type wind tunnel to said elongate confinement tunnel so as to compress and heat said mass of feed air and open said outlet orifice at said temperature closure device.

* * * * *

UNITED STATES PATENT AND TRADEMARK OFFICE
CERTIFICATE OF CORRECTION

PATENT NO. : 5,311,774
DATED : May 17, 1994
INVENTOR(S) : Pierre Sava, Alain Chevalier, Jean-Pierre Minard, Dominique Piton, Gerard Pradet It is certified that error appears in the above-indentified patent and that said Letters Patent is hereby corrected as shown below:

Column 3, line 35, after "$d_r$" insert ---- · ----.

Column 3, line 45, delete "mabs" insert ---- mass ----.

Column 3, line 50, after "since" insert ---- in practice ----.

Column 3, line 67, delete "to" insert ---- of ----.

Column 4, line 16, delete "heater-" insert ---- heater ----.

Column 4, line 49, after "are" insert ---- a ----.

Column 5, line 32, after "6.5" insert ---- . ----.

Column 8, line 3, delete ---- , ----.

Column 8, line 40, delete "presssure" insert ---- pressure ----.

Column 11, line 18, after "to" insert ---- mean ----.

Signed and Sealed this

Thirteenth Day of September, 1994

Attest:

BRUCE LEHMAN

Attesting Officer     Commissioner of Patents and Trademarks